Patented Dec. 16, 1930

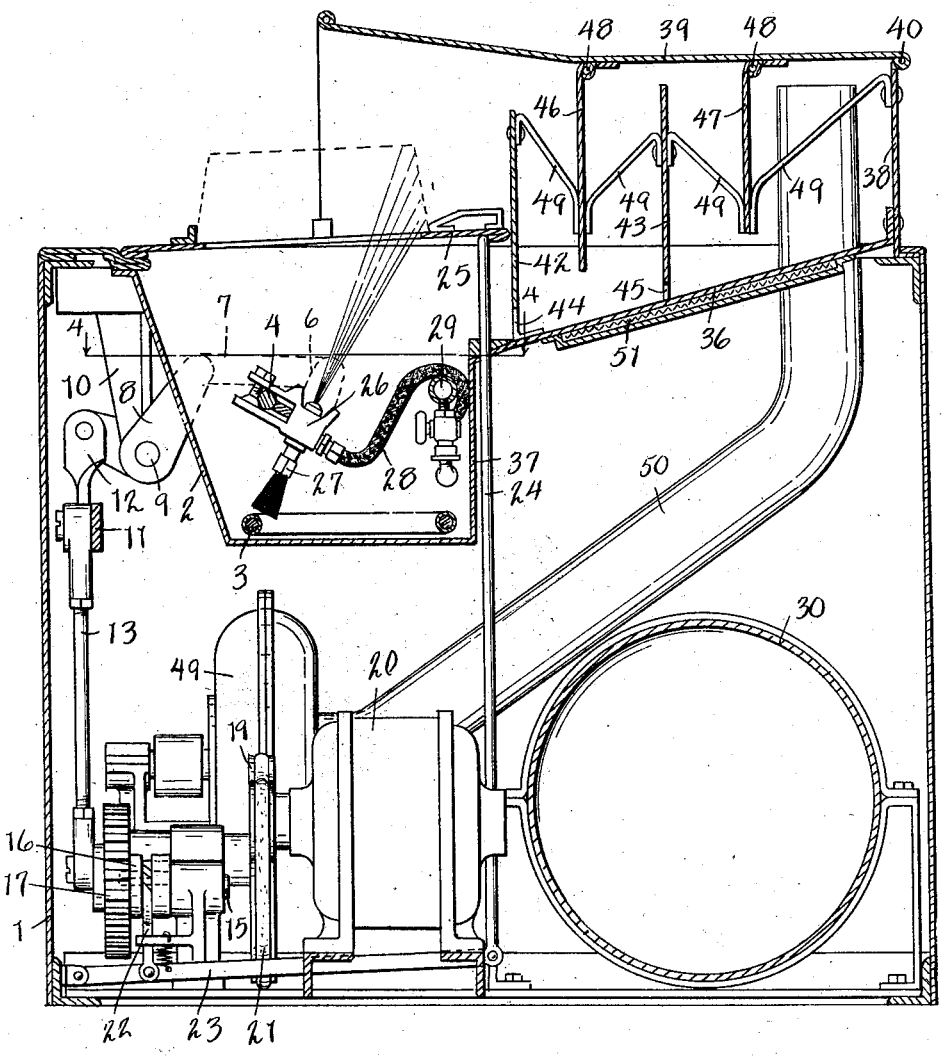

1,785,346

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

SEPARATOR

Original application filed May 1, 1926, Serial No. 106,025. Divided and this application filed January 6, 1928. Serial No. 244,872.

My improved separator is especially designed by me for embodiment in coating machines for the greasing of baking pans and the like and I have illustrated the same as embodied in a machine for that purpose shown in my application for Letters Patent, Serial No. 106,025 filed May 1, 1926, which has matured into Patent #1,741,155, issued Dec. 31, 1929, this application being a division of said application. However, the features to which this application are directed are adapted and desirable for use in machines having other spraying means than that illustrated in said application.

The main objects of this invention are:

First, to provide a structure of the class described in which the atomized grease or other material escaping from the spraying tank or chamber is effectively separated from the air and collected.

Second, to provide a separating and collecting means for coating machines which is very efficient.

Third, to provide an improved separating means for pan greasing machines and the like in which the parts may be quickly cleaned or freed from the collected material.

Objects relating to details and economies of my invention will appear from the detailed description to follow. The invention is defined and pointed out in the claims.

A structure which is a preferred embodiment of my invention is illustrated in the accompanying drawing, forming a part of this application, in which:

The figure is a vertical section from front to rear of a pan greasing machine embodying my improvements.

Referring to the drawing, I provide a cabinet designated generally by the numeral 1 and of such dimensions as to house the main parts of the machine. At the upper end of this cabinet I suspend a tank 2 for grease such as lard or other suitable material, this tank being provided with a heating coil 3. A rockshaft 4 extends longitudinally of the tank and is provided with arms 6 connected by links 7 to arms 8 of the bell crank levers pivoted at 9, only one of these levers being shown. These levers are supported on hangers 10 and are connected by a cross bar 11 having arms 12 pivoted to the bell crank levers 8. The cross bar 11 is connected by pitmen 13 to a crank 14 on the shaft 15, the hanger of the bell crank lever at one end of the machine only being illustrated.

The shaft 15 has a clutch designated generally by the numeral 16 adapted to connect the shaft to the gear 17 meshing with a pinion 18 connected to the pulley 19 driven from a motor 20 through the belt 21.

The clutch is controlled by the member 22 connected by lever 23 having a push rod 24 connected to the swinging end thereof and positioned to coact with the pan table 25 so that a downward push on the pan table withdraws the control member 22, allowing the clutch to engage and thereby oscillating the shaft 4. This shaft is provided with a plurality of nozzles 26 having grease intakes 27 and air intakes 28, the air intakes being flexible and connected to the delivery pipe 29 which is in turn connected to the storage tank 30, the connections not being shown.

An air valve control mechanism is provided, preferably that shown in my said application for Letters Patent, Serial No. 106,025, the mechanism being such that the valve is simultaneously opened with the oscillating of the nozzles.

The pump for supplying air to the storage tank 30 is not illustrated.

My improved separator is designed to prevent atomized grease from escaping into the room and protecting the operator and also saving the grease. In the embodiment illustrated, it consists of a separating chamber having a bottom 36 extending upwardly and rearwardly from the rear wall 37 of the tank. This separating chamber has a rear wall 38, a top 39 hinged to the rear wall at 40 and sides 41 depending from and carried by the top. Bottom baffles 42 and 43 are carried by the bottom wall projecting upwardly therefrom. These baffles have openings 44 and 45 at the bottom thereof permitting grease dropping or collecting upon the bottom 36 to run back into the tank, and also so that the fumes may pass from the tank into the separator.

The top 39 has baffles 46 and 47 depending therefrom, these baffles being connected to the top by hinges 48. Downwardly diverging guides 49 are provided for these baffles 47 so that the top may be swung to open position, exposing the baffles so that the collected grease may be scraped from the walls of the separator and when the top is swung down to closed position, the baffles 46 are automatically swung to an upright position and retained in an upright position by these guides. The several baffles are thus supported in staggered or alternating relation so that the air passing through the separator takes a zig-zag course. The front end of the top of the separator overhangs the tank.

An exhaust fan or blower 49 is connected to the rear of the separator chamber by means of the pipe 50. This blower is driven from a motor, the driving connections however not being illustrated.

As the grease laden air passes through the separator, coming into contact with the baffles and walls thereof, the grease collects thereon. In practice, it is found that a portion of this grease slides down or drops from the baffles onto the bottom 36. To prevent undue accumulation thereon, these baffles are provided with heating elements conventionally shown at 51.

My improved machine is very efficient in collecting or separating grease from the air and also in drawing the grease laden air into the separator so that it does not escape into the room. The separator is, as stated, very easily cleaned, as occasion requires.

I have illustrated and described my improvements in an embodiment which has proven highly satisfactory commercially. I have not attempted to illustrate or describe various embodiments or adaptations which I contemplate as it is believed that this disclosure will enable those skilled in the art to embody or adapt my improvements as may be desired.

Having thus described my invention, what I claim as new and desire to secure by Letters Patent, is:

1. In a structure of the class described, the combination of a tank, a separator chamber comprising a forwardly inclined bottom wall extending rearwardly from the top of the rear wall of said tank, a rear wall for said chamber, a top hinged at its rear end to said chamber rear wall to overhang said tank, said top being provided with depending side walls, baffles mounted in spaced relation on said separator chamber bottom, said baffles having openings at the bottom thereof, coacting baffles pivotally mounted on said top to depend therefrom in alternating relation between said bottom baffles, said bottom baffles being provided with opposed downwardly inclined guiding and supporting members for said top baffles whereby they are swung to and supported in vertical position when the top is lowered, and an exhaust means connected to the rear of said separator chamber.

2. In a structure of the class described, the combination of a tank, a separator chamber comprising a bottom wall extending rearwardly from the top of the rear wall of said tank, a rear wall for said chamber, a top hinged at its rear end to said chamber rear wall to overhang said tank, baffles mounted in spaced relation on said separator chamber bottom, coacting baffles pivotally mounted on said top to depend therefrom in alternating relation between said baffles, and an exhaust means connected to the rear of said separator chamber.

3. In a structure of the class described, a separator chamber comprising a hinged top, bottom baffles projecting upwardly from the bottom of the separator chamber, top baffles pivotally mounted on said top to depend therefrom in alternating relation to said bottom baffles, said bottom baffles being provided with opposed downwardly inclined guiding and supporting members for said top baffles whereby they are swung to vertical position between said bottom baffles when the top is lowered, and an exhaust means connected to the rear of the separator chamber.

4. In a structure of the class described, a separator chamber comprising a top hinged at one end to swing in a vertical plane, bottom baffles projecting upwardly from the bottom of the separator chamber, top baffles pivotally mounted on said top to depend therefrom in alternating relation to said bottom baffles, and an exhaust means connected to the rear of the separator chamber.

5. In a structure of the class described, a separator chamber provided with a hinged top, baffles mounted in spaced relation within said separator chamber, coacting baffles pivotally mounted on said top to coact with the first mentioned baffles, and means for guiding said baffles on said top to a vertical position when said top is lowered to operative position.

6. In a structure of the class described, a separator chamber provided with a top hinged at one end to swing in a vertical plane, baffles mounted in spaced relation within said separator chamber, and coacting baffles pivotally mounted on said top to coact with the first mentioned baffles.

In witness whereof I have hereunto set my hand.

CHARLES T. HATCH.